US012293853B2

United States Patent
Ein-Eli et al.

(10) Patent No.: US 12,293,853 B2
(45) Date of Patent: May 6, 2025

(54) CARBON-NANOTUBES COPPER COMPOSITE CONDUCTORS

(71) Applicant: Technion Research & Development Foundation Limited, Haifa (IL)

(72) Inventors: Yair Ein-Eli, Haifa (IL); Neta Yitzhack, Haifa (IL); Nina Sezin, Haifa (IL); David Starosvetsky, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 271 days.

(21) Appl. No.: 17/611,202

(22) PCT Filed: May 14, 2020

(86) PCT No.: PCT/IL2020/050531
§ 371 (c)(1),
(2) Date: Nov. 15, 2021

(87) PCT Pub. No.: WO2020/230141
PCT Pub. Date: Nov. 19, 2020

(65) Prior Publication Data
US 2022/0223314 A1    Jul. 14, 2022

Related U.S. Application Data

(60) Provisional application No. 62/847,966, filed on May 15, 2019.

(51) Int. Cl.
*H01B 1/04*     (2006.01)
*C01B 32/174*   (2017.01)
(Continued)

(52) U.S. Cl.
CPC ........... *H01B 1/026* (2013.01); *C01B 32/174* (2017.08); *C25D 3/40* (2013.01); *C25D 5/54* (2013.01);
(Continued)

(58) Field of Classification Search
CPC .................................. H01B 1/04; H01B 1/06
See application file for complete search history.

(56) References Cited

U.S. PATENT DOCUMENTS 10,017,389 B2    7/2018  Hata et al.
10,213,984 B2 *  2/2019  Restuccia ............... B32B 27/06
(Continued)

FOREIGN PATENT DOCUMENTS

EP           2660361       11/2013
WO      WO 2020/230141    11/2020

OTHER PUBLICATIONS

Supplementary European Search Report and the European Search Opinion Dated Jul. 7, 2023 From the European Patent Office Re. Application No. 20806786.8. (7 Pages).
(Continued)

*Primary Examiner* — Chau N Nguyen

(57) ABSTRACT

Provided herein are composite conductors, characterized by having copper deposits inside the bulk rather than on the outer surface of a non-metallic conductive porous matrix, such as CNT fabric, as well as a process for obtaining the same. The composite conductors provided herein are also characterized by a low specific weight and a high ampacity compared to metal conductors of similar size and shape.

16 Claims, 6 Drawing Sheets

(51) Int. Cl.
- C25D 3/40 (2006.01)
- C25D 5/54 (2006.01)
- H01B 1/02 (2006.01)
- H01B 13/00 (2006.01)
- B82Y 30/00 (2011.01)
- B82Y 40/00 (2011.01)

(52) U.S. Cl.
CPC .......... *H01B 13/0036* (2013.01); *B82Y 30/00* (2013.01); *B82Y 40/00* (2013.01); *C01B 2202/22* (2013.01)

(56) References Cited

U.S. PATENT DOCUMENTS

| | | | |
|---|---|---|---|
| 2007/0199826 A1 | 8/2007 | Son et al. | |
| 2016/0097129 A1 | 4/2016 | Jung | |
| 2016/0137504 A1* | 5/2016 | Hata | H01B 1/04 252/503 |
| 2017/0145225 A1* | 5/2017 | Okada | C09C 1/02 |

OTHER PUBLICATIONS

International Search Report and the Written Opinion Dated Jun. 25, 2020 From the International Searching Authority Re. Application No. PCT/IL2020/050531. (15 Pages).

Carpio et al. "Review—Management of Copper Damascene Plating", Journal of the Electrochemical Society, 166(1): D3072-D3096, Published Online Nov. 3, 2018.

Dini et al. "Electrodeposition of Copper", Modern Electroplating, 5th Ed., Chap.2: 33-78, Oct. 4, 2010.

Hannula et al. "Carbon Nanotube-Copper Composites by Electrodeposition on Carbon Nanotube Fibers", Carbon, 107: 281-287, Published Online Jun. 3, 2016.

Jarosz et al. "Carbon Nanotube Wires and Cables: Near-Term Applications and Future Perspectives", Nanoscale, 3(11): 4542-4553, Published Online Oct. 7, 2011.

Kayal et al. "Wetting and Dewetting of Narrow Hydrophobic Channels by Orthogonal Electric Fields: Structure, Free Energy, and Dynamics for Different Water Models", The Journal of Chemical Physics, 143(22): 224708-1 224708-13, Published Online Dec. 14, 2015.

Miao "Electrical Conductivity of Pure Carbon Nanotube Yarns", Carbon, 49(12): 3755-3761, Available Online May 11, 2011.

Peng et al. "Ultrasonic-Assisted Fabrication of Highly Dispersed Copper/Multi-Walled Carbon Nanotube Nanowires", Colloids and Surfaces A: Physicochemical and Engineering Aspects, 342(1-3): 132-135, Available Online Apr. 24, 2009.

Subramaniam et al. "One Hundred Fold Increase in Current Carrying Capacity in a Carbon Nanotube-Copper Composite", Nature Communications, 4(2202): 1-7, Jul. 23, 2013.

Sundaram et al. "Electrical Performance of Lightweight CNT-Cu Composite Wires Impacted by Surface and Internal Cu Spatial Distribution", Scientific Reports, 7(9267): 1-11, Published Online Aug. 24, 2017.

Sundaram et al. "The Influence of Cu Electrodeposition Parameters on Fabricating Structurally Uniform CNT-Cu Composite Wires", Materials Today Communications, 13: 119-125, Published Online Sep. 20, 2017.

Walther et al. "Carbon Nanotubes in Water: Structural Characteristics and Energetics", The Journal of Physical Chemistry B, 105(41): 9980-9987, Published on Web Sep. 21, 2001.

Xu et al. "Continuous Electrodeposition for Lightweight, Highly Conducting and Strong Carbon Nanotube-Copper Composite Fibers", Nanoscale, 3(10): 4215-4219, Published Online Aug. 30, 2011.

* cited by examiner

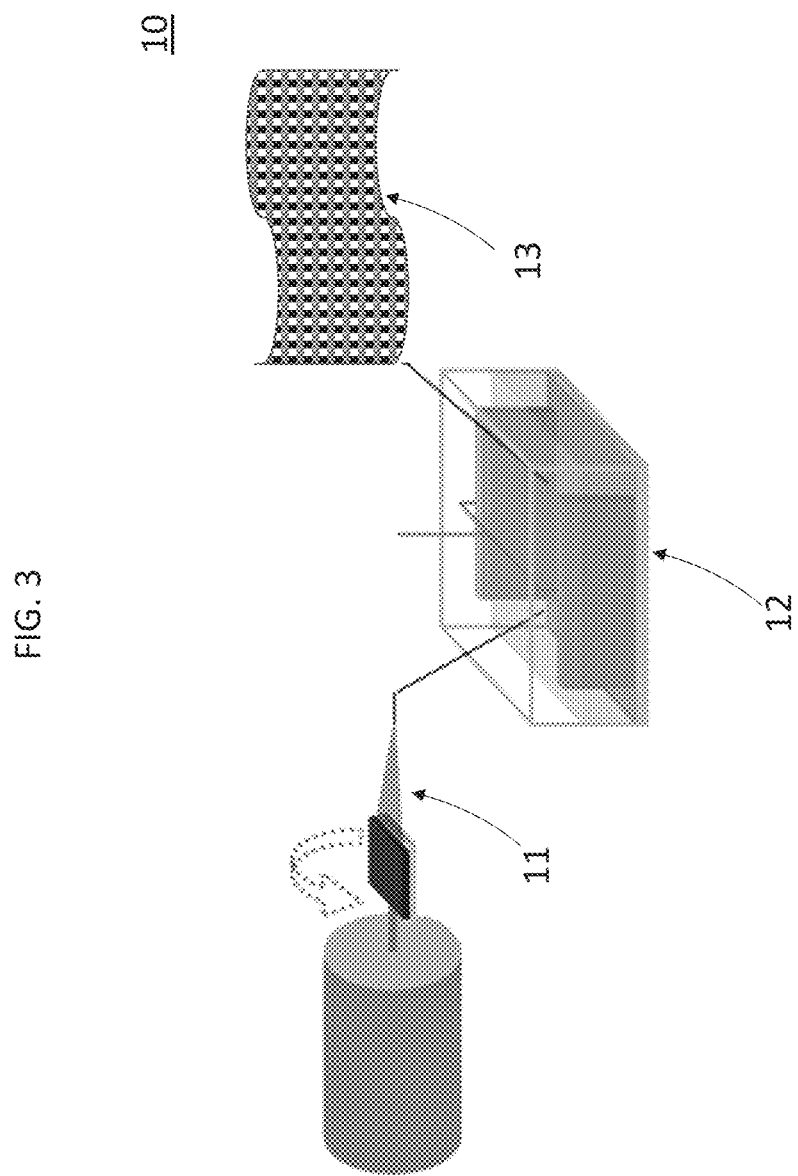

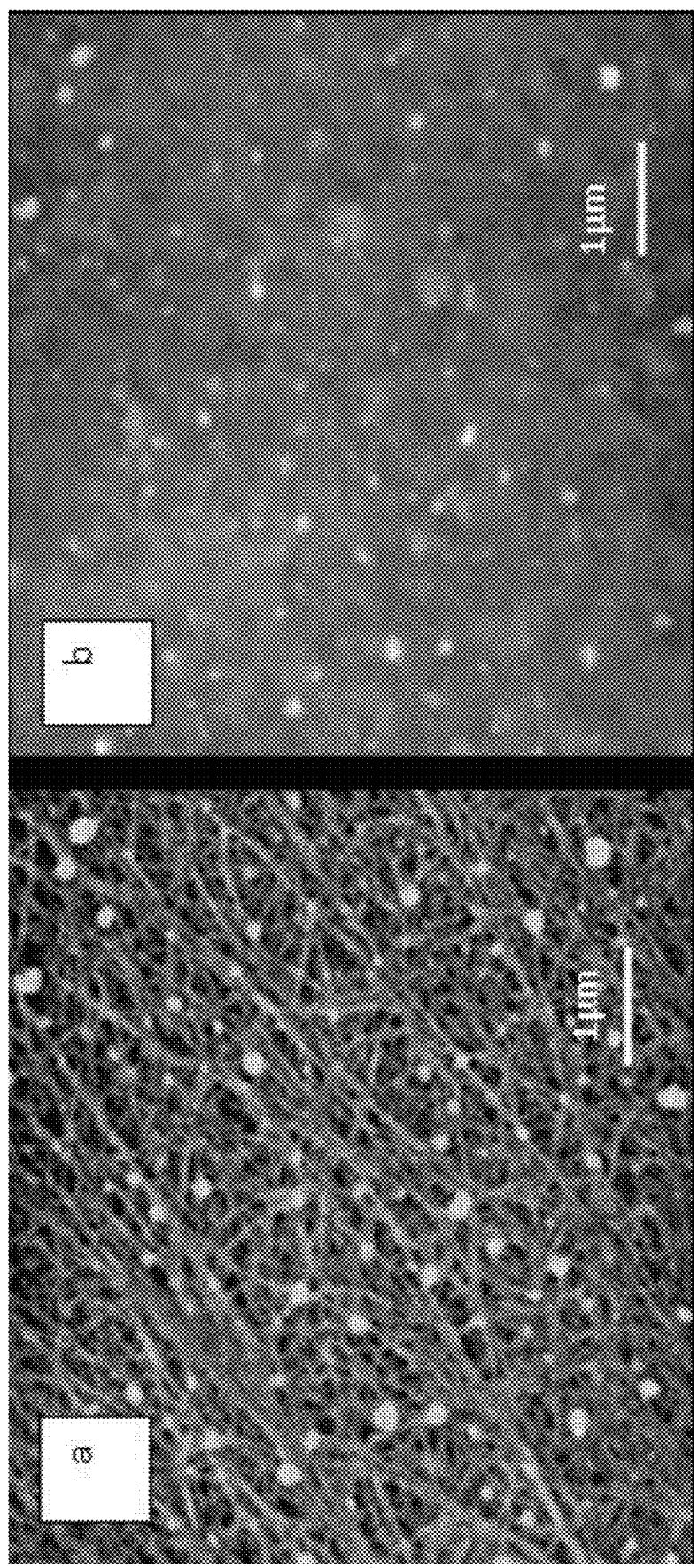

CARBON-NANOTUBES COPPER COMPOSITE CONDUCTORS

RELATED APPLICATIONS

This application is a National Phase of PCT Patent Application No. PCT/IL2020/050531 having International filing date of May 14, 2020, which claims the benefit of priority under 35 USC § 119 (e) of U.S. Provisional Patent Application No. 62/847,966 filed on May 15, 2019. The contents of the above applications are all incorporated by reference as if fully set forth herein in their entirety.

FIELD AND BACKGROUND OF THE INVENTION

The present invention, in some embodiments thereof, relates to electric conductive structures, and more particularly, but not exclusively, to composite non-metallic conductive porous matrix having copper metal deposited therein.

Nowadays, conventional copper and aluminum conductor materials utilized in wire and cabling manufacturing are close to the critical limit of electrical conductivity and current carrying capacity (ampacity). In high-tension power transmission lines, the required tensile strength, mechanical and thermal stability to withstand a thermal load necessitates these cables to be fabricated from aluminum alloy with steel reinforcement core. In applications with high carrier frequencies transmitting data electrical permittivity and magnetic susceptibility of the cable shield material (typically metal foil or fibers) affects the degree of interference between cables. Reliability and environmental tolerance are very important factors for conductors, which must be able to withstand large variation in temperature, without substantial change in the cable resistivity. Progressive miniaturization of the electronic devices particularly for air/space-craft or medical applications, where material conductors is a substantial source of mass, weight reduction is extremely desirable. Therefore, lightweight composite materials capable transmitting electrical power with a minimal loss is of great demand.

One of the disadvantages of currently known carbon nanotubes-copper (CNT-Cu) composite elements, produced by electrodeposition of a metal such as copper over CNT fibers is the massive loss of the tensile strength (about 35-50% loss) of the CNT-Cu composite with thicker copper coating (5 μm), compared to the pure CNT fiber. Another known approach is CNT-Cu composites fabrication by a two-stage nucleation-growth electrodeposition process. In the first stage, the nucleation of Cu on the CNT surface is conducted by dipping the hydrophobic CNT fibers in organic solution containing Cu ions and electrodeposition of Cu seed layer. In the second stage, Cu seeds growth was progressed in the aqueous copper sulfate solution until complete filling of the CNT fiber mesoporous structures. The formed CNT-Cu composite than experiences annealing in hydrogen ambient in order to improve its electrical conductivity. A major disadvantage of this process is the use of a complicated plating with the use of organic solvents.

U.S. Pat. No. 10,017,389 provides a CNT-copper composite material comprising copper deposited into a plurality of aligned (oriented) CNTs, and limited to a small size element based on the size of the oriented CNT aggregate.

Additional background art includes Subramaniam, C. et al., *Nature communications*, 2013; Xu, G. et al., *Nanoscale*, 2011, 3, 4215-4219; Jarosz, P. et al., *Nanoscale*, 2011, 3, 4542; Kayal, A. et al., *J. Chem. Phys.*, 2015, 143, 224708; Walther, J. H. et al., *J. Phys. Chem. B*, 2001, 105, 9980-9987; Miao, M., *Carbon*, 2011, 49, 3755-3761; and Peng, Y. et al., *Colloids and Surfaces A: Physicochem. Eng. Aspects*, 2009, 342, 132-135.

SUMMARY OF THE INVENTION

The present invention is drawn to a composite electrical conductor material, which is based on structural elements of a matrix of a non-metallic conductive material, such as fibers, sheets, strips and the likes, that can be weaved, spun and/or breaded into wires, cables and the likes, which are impregnated with metallic copper particles and clusters that are interconnected electrically by copper dendrites and/or the matrix, to form the composite electrical conductor material provided herein. Unlike other known composites, the composite electrical conductor material presented herein is characterized by copper being incorporated inside the bulk of the structural element rather than only on its outer surface, a unique feature that is afforded by a unique electrodeposition process. Hence, the present invention also provides a process for manufacturing the composite conductor element provided herein, which is effected by slow and controlled aqueous acidic/basic copper electrodeposition followed by spinning/weaving of the copper-impregnated composite conductive elements into usable electric circuit component that can be used in an electric device.

Thus, according to an aspect of some embodiments of the present invention there is provided a composite conductor element, includes a non-metallic conductive porous matrix and a plurality of metallic copper particles incorporated therein, wherein the copper particles are incorporated within a bulk of the matrix, and exhibiting an ampacity of at least 100 A/cm2 over at least 100 μm of the element.

In some embodiments, the composite element is characterized by a specific gravity that ranges from 1.5 g/cm$^3$ to 8.5 g/cm$^3$.

In some embodiments, the non-metallic conductive porous matrix is formable, ductile and scalable.

In some embodiments, the non-metallic conductive porous matrix in a non-oriented matrix.

In some embodiments, the non-metallic conductive porous matrix is selected form the group consisting of a carbon nanotube fabric, a carbon microfiber matrix, a graphene fiber fabric, a Buckminsterfullerene matrix, a carbon nanofoam matrix, and carbon nanobuds matrix.

In some embodiments, the copper particles are arranged in clusters of metallic copper crystals having a size that ranges from 1 nm to 150 μm.

In some embodiments, the copper particles are connected to each other by metallic copper threads forming a metallic copper network on and/or via the non-metallic conductive porous matrix.

According to another aspect of some embodiments of the present invention, there is provided a process of manufacturing the element provided herein, which is effected by submerging a non-metallic conductive porous matrix in an aqueous electrolyte that includes copper ions, and applying a current/potential to effect copper deposition, wherein the electrolyte characterized by a throwing power of at least 15%, and/or includes an organic additive.

In some embodiments, the organic additive is a suppressing agent and/or a leveling agent.

In some embodiments, the organic additive is selected from the group consisting of polyethylene glycol, benzotriazole, thiourea, acetonitrile, a polyether, a polyoxyether, a thiol, an azole, an imidazole, and any combination thereof.

In some embodiments, the aqueous electrolyte includes copper cyanide, copper pyrophosphate and copper fluoborate.

In some embodiments, the aqueous electrolyte is essentially devoid of the organic additive.

In some embodiments, the copper deposition is effected by:

applying about −0.2 VSEC to −0.35 VSEC for a time period of 1 minute to 1 hour, when using the acidic aqueous electrolyte;

applying about −0.5 VSEC to −1.3 VSEC for a time period of 1 minute to 1 hour, when using the basic aqueous electrolyte; or applying a constant current of about −5 to −15 mA/cm$^2$ for a time period of 1 minute to 1 hour, when using the acidic or basic aqueous electrolyte.

In some embodiments, when using the acidic aqueous electrolyte, the process is effected by applying a constant potential at a level that causes hydrolysis and hydrogen evolution.

In some embodiments, when using the basic aqueous electrolyte, the process is effected by applying a pulse potential.

According to another aspect of some embodiments of the present invention, there is provided an electric device, which includes the composite conductor element provided herein.

In some embodiments of the present invention, the device is a micro-electronic circuit board, or an ultra-fast charging cable.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying images. With specific reference now to the images in detail, it is stressed that the particulars shown are by way of example and for purposes of illustrative discussion of embodiments of the invention. In this regard, the description taken with the images makes apparent to those skilled in the art how embodiments of the invention may be practiced. In the Images:

FIG. 3 presents a schematic illustration of a composite conducting element fabrication process 10, wherein matrix strip 11 is spun to a thread that is submerged in copper electrodeposition bath 12, and thereafter weaved into sheet 13, and manufacturing device, according to some embodiments of the present invention;

(FIG. 4A) −30 mV, 60 s; (FIG. 4B) −30 mV, 600 s in acid copper sulfate electrolyte; and FIGS. 5A-B presents HRSEM images (FIG. 5A) secondary electron (SE) and (FIG. 5B) back scattered electron (BSE), obtained from the surface CNT fabric at copper deposition between two glass shields on CNT fabric strip at cathodic potential −30 mV, 600 seconds in acid copper sulfate electrolyte.

DESCRIPTION OF SOME SPECIFIC EMBODIMENTS OF THE INVENTION

The present invention, in some embodiments thereof, relates to electric conductive structures, and more particularly, but not exclusively, to composite non-metallic conductive porous matrix having copper metal deposited therein.

The principles and operation of the present invention may be better understood with reference to the figures and accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Figure 1:
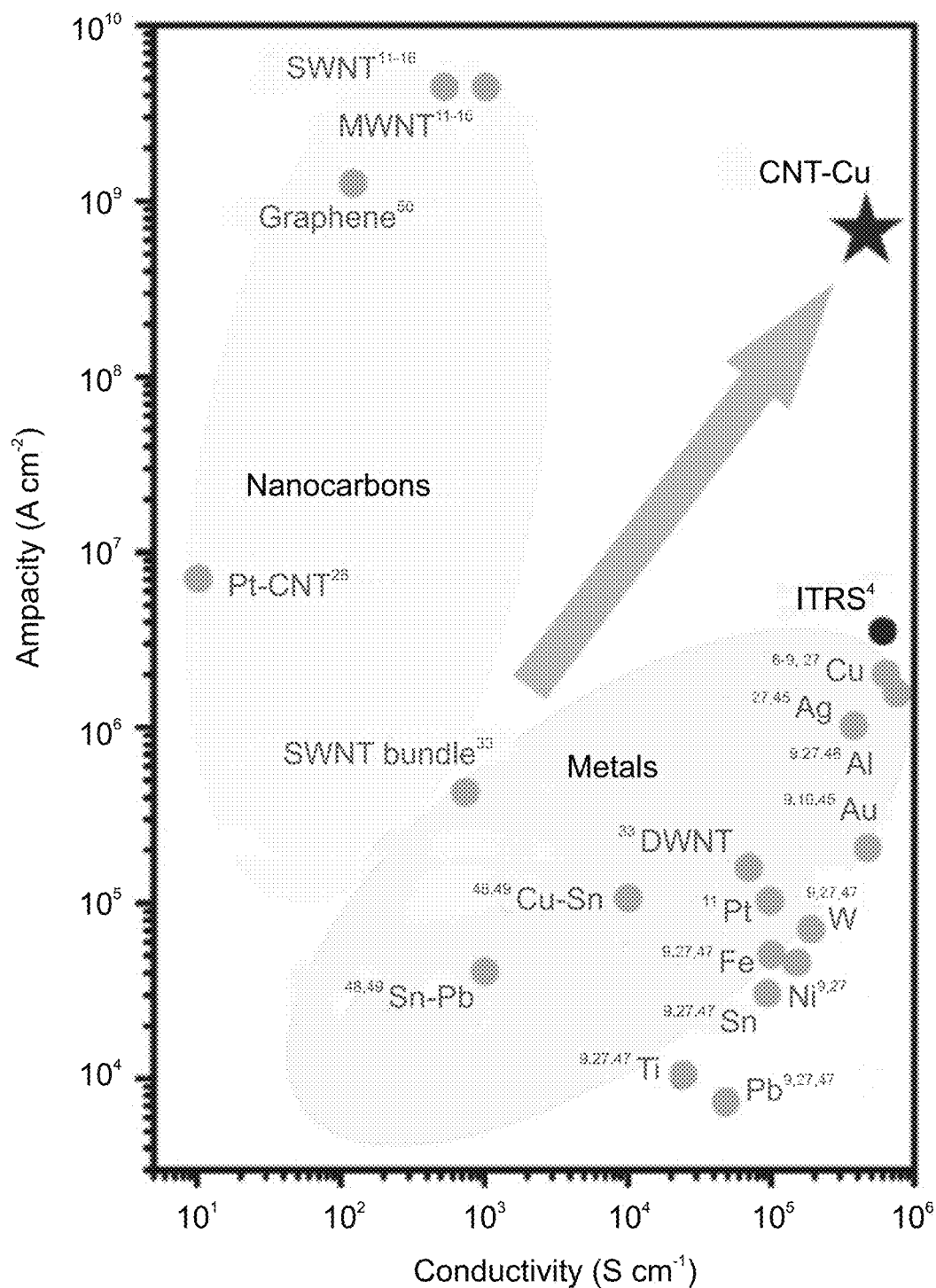
FIG. 1 presents an Ashby plot of ampacity versus conductivity for various materials relevant in the context of embodiments of the present invention.

As discussed hereinabove, copper, aluminum, and theirs alloys, currently used as electrical conductors, operated close to the limit of current carrying capacity (see, FIG. 1). The presently disclosed product and methodology provide composite materials exhibiting higher electrical conductance with higher capability to carry currents at a significantly lower weight. In addition, corrosion issues, related to the pure metallic conductors, are eliminated in the presently disclosed conductive composites, as the Cu clusters are embedded into a non-metallic conductive matrix, such as CNT fabrics, shielding them from any environmental degradation.

While searching for a new composite material for lightweight electrical power conductors with higher current carrying capacity, substantially higher than current materials being used in the industry, such as copper and aluminum, the present inventors have developed a composite material that is based on CNT fabric being electrochemically impregnated with copper clusters. The composite materials provided herein present higher (by orders of magnitude) electrical conductivity than a pure CNT fabric, as well as higher current-carrying capacity (termed "ampacity") than pure copper.

Figure 2:
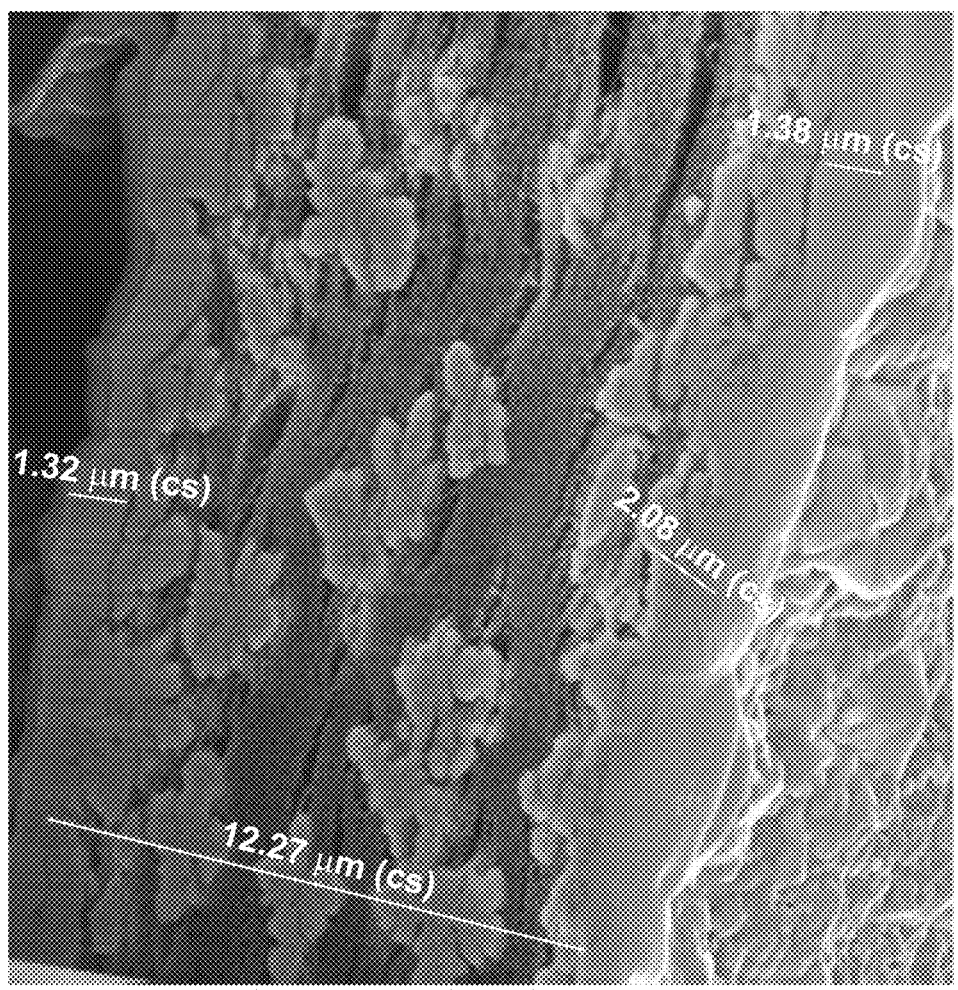
FIG. 2 presents an electro-micrograph of the external surface and the inside of a CNT fabric, having copper coating over, and nucleation growth inside the CNT fabric.

While developing an ultra-light anode current collector for Li-ion batteries based on thin and flexible CNT fabric, aiming to replace the heavy weight copper foil serving as the current collector, the present inventors have investigated the CNT fabrics manufactured as lightweight electrodes via copper electrodeposition over the surface of the CNT fabric. The inventors observed a very thin (1-2 μm) uniform copper film with insignificant copper penetration into the bulk CNT fabric, which was formed in a single step electroplating process from aqueous copper electrolytes, as shown in FIG. 2. Effective improving in coverage and planarity of the copper film was achieved after preliminary treatment of the CNT fabric in alcohol and curing in air ambient at a relative low temperature. To limit copper penetration into the bulk CNT fabric, copper plating was realized during first 1-2 second at high cathodic potentials, followed by growth of copper film on the outer CNT surface that continued at decreased current density. For example, the thin flexible electrode with thickness 16 µm with well adherent 4 µm copper film, as a current collector was lighter than a pure copper current collector was and exhibited electrical conductivity higher by nearly one order of magnitude than pure CNT. Based on these results obtained in developing the current collector, the present inventors have contemplated the fabrication of lightweight composite conductors for an electrical power transmission system, by weaving of the Cu specially coated CNT micro-strips in yarn or cables (see, FIG. 3). The present inventors have contemplated that if copper will be electrodeposited on the CNT strip at a single and slow electrodeposition process, the fiber will be impregnated by copper inside the bulk of the fiber rather than on its surface. It was contemplated that using aqueous electrolyte and low current at the plating step of the CNT strip, will achieve the desired impregnation. It was further contemplated that the impregnated CNT strips will be weaved into stretchable yarns or cables once exiting the electrolytic bath.

As demonstrated hereinbelow, this process was applied on CNT fabric strips, and afforded composite material for electrical conductors having different CNT volume density compared to the outerly (outwardly, externally) deposited CNT elements, and as a result, the composite CNT-Cu elements exhibited higher ampacity and lower mass.

The present inventors have thus developed a cost effective process for metal impregnation of copper into the CNT fabric bulk that enable the fabrication of composite conductors in the form of cables or yarn in fully automated process. The composite CNT-Cu conductors provided herein are able to withstand large changes in temperature and ambient pressure, without a substantial variation in resistivity or impedance. The high strength CNT-Cu composite material presented herein is a most promising candidate for fabrication of the lightweight and flexible conductors with higher ampacity (current carrying capacity) and a broad environmental stability (minimization of corrosion processes). The CNT-Cu composite presented herein is an ideal conductor for lightweight power transmission system like cables for aerospace, microelectronic, battery packs for EV's (electric vehicles) and many electronic and medical applications.

The Cu-electrodeposited CNT fabrics provided herein achieved ampacity of more than 8 times higher than that of uncoated CNT (1800 vs. 88 A/cm), and greater than that of copper, and a weight of less than 50% that of a comparable copper element.

While attempting to implement the teaching provided in U.S. Pat. No. 10,017,389, it was found that the requirement of the matrix being an aligned and oriented CNT aggregate, limited the usability of the resulting composite material to very small (few 10 s of microns), expensive and generally impractical for industrial use. The same teaching, when applied to other non-metallic and electro-conductive porous matrices, which are more practical for being formable, ductile and scalable, the resulting composites did not exhibit the required ampacity.

An Organic-Cu Composite Conductive Element:

Thus, according to an aspect of embodiments of the present invention, there is provided a composite conductor element, that includes a non-metallic conductive porous matrix having a plurality of metallic copper particles incorporated therein, namely the copper particles are incorporated within a bulk of the matrix, such that the composite conductor element exhibits an ampacity of at least 100 A/cm². The ability of the herein-provided composite conductor element to exhibit this ampacity is essentially not limited by the size of the element, and therefore it is said that this ampacity is exhibited over at least 100 µm of the element.

Being based on a light and conductive matrix, the herein-provided element is characterized by a specific gravity that is much lower than that of copper, yet still provides at least, if not superior conductivity, heat dissipativity, ampacity and mechanical properties of copper. In some embodiments, the specific gravity of the herein-provided element ranges from 1.5 g/cm³ (pristine CNT fabric) to 8.5 g/cm³ (copper).

One way to identify and define the herein-provided composite conductor element, is by viewing a cross-section thereof under an electron microscope, which reveals the microstructure of the copper particles positioned within the bulk of the porous matrix, namely within its pores. Thus, the composite conductor element is characterized by exhibiting metallic copper particles arranged in clusters of metallic copper crystals having a size that ranges from 1 nm to 150 µm, and being connected to each other by metallic copper threads forming a metallic copper network on and/or via the non-metallic conductive porous matrix.

According to some embodiments of the present invention, there are provided non-metallic conductive porous matrices, such as carbon-nanotube (CNT) fabrics, in the form of structural elements, such as strips, sheets and fibers, having metallic copper deposited substantially inside the element's bulk rather than only on the element's outer surface. The mass of the matrix-Cu composite is characterized by a specific weight (also known as the unit weight) that is 4-, 5-, 6-time and more, lower than a comparable copper sheet, while exhibiting a higher ampacity compared to that of pure copper, whereas specific weight is the weight per unit volume of a material.

A Non-Metallic Conductive Porous Matrix:

According to embodiments of the present invention, non-metallic and electro-conductive porous matrices, serves as a substrate for copper crystals formation within the bulk (in the pores) of the matrix. Such unique copper nucleation and crystallization is afforded during copper deposition under specific conditions conducive to forming copper crystals within the bulk of the porous matrix and not only on its surface.

The term "non-metallic conductive porous matrix", or "organic conductive porous matrix", as used herein, refers to any porous matrix made of conductive organic polymers, and/or various forms of organic macromolecules, and/or various forms of carbon allotropes, having electro-conductivity to some substantial degree, without relying on metallic elements.

The non-metallic conductive porous matrix that, according to embodiments of the present invention, is useful for copper deposition therein, formable, ductile and scalable. These macroscopic characteristics of the matrix render the resulting composite element industrially useful and applicable for various electronic uses. For example, the matrix is formable and ductile, meaning it is not brittle or limited in its reshapability before and after copper deposition therein, being non-brittle and thus mechanically manipulable. In addition, the matrix can be produced in any shape and size (scalable), as it is not limited due to specific properties of its microstructure. In essence, the mechanical properties of the matrix are bestowed on the resulting composite element, or in other words, the properties of the composite element provided herein are substantially inherited from the matrix it is made of.

One of the properties that allow the herein-provided composite element, according to some embodiments of the present invention, is that the non-metallic conductive porous matrix in a non-oriented matrix. As presented hereinabove, the teaching of U.S. Pat. No. 10,017,389 provide a rather limited composite element, as it is critical for its production that the substrate be an oriented (aligned) CNT aggregate, which is rigid, very small (less than 100 μm), very hard to afford, and thus very expensive.

Thus, according to some embodiments of the present invention, the term "non-metallic conductive porous matrix', as used herein, encompasses matrices made of carbon microfibers, graphene fiber fabrics, carbon nanotube fabrics, Buckminsterfillerene matrices, carbon nanofoam matrices, carbon nanobuds matrices, and the likes. Also contemplated are other forms of matrices comprising conductive organic polymers, as these are known in the art.

A Process of Manufacturing CNT-Cu Composite Elements:

Copper deposition is a widely known process, however, in order to afford the presently provided composites, copper deposition is conducted under conditions that are conducive to the formation of copper crystal nucleation inside the porous structure of the non-metallic conductive porous matrix. The electrolyte composition, the deposition potential/current, and the potential/current profile (i.e., continuous, striking, pulse, etc.), are controlled as described hereinbelow to effect the desired copper deposition in the bulk of the matrix.

The presently disclosed composite elements, such as CNT strips and fibers, having copper deposited inside their balk (and not substantially over their surface), is effected essentially as described hereinbelow. Briefly, structural elements made of a non-metallic conductive porous matrix (e.g., CNT fabric), such as strips, fabrics, fibers, bundles and the likes, are submerged in an electrodeposition bath containing an aqueous electrolyte that includes copper ions, and by applying current/potential, copper is electrodeposited under electrochemical conditions that conducive to copper seeds infiltration into the pores of the matrix, i.e., between individual structural elements of the matrix, e.g., between carbon nanotubes in a carbon nanotubes (CNT) fabric matrix.

According to some embodiments of the present invention, the conducive conditions include compositional properties of the electrolyte, such as its throwing power, being at least 15%, and/or the presence of an organic additive, as these are discussed hereinbelow.

The process provided herein allows metallic copper to deposit and form clusters in the spaces and pores of the matrix. The clusters further drive percolation of copper into the spaces, forming an internal web of metallic connection. It is assumed that the intrinsic matrix becomes a more efficient current carrier being supplemented by the microsized interconnected network of copper clusters.

In some embodiments, the process is effected by submerging the non-metallic conductive porous matrix in an acidic copper ion-containing electrolyte, while the electrodeposition potential is effected, continuously or pulsewise, at a level that causes hydrogen evolution (hydrolysis) in the matrix.

In some embodiments, the process is effected by submerging the non-metallic conductive porous matrix in a basic copper ion containing electrolyte, while the electrodeposition potential is effected according to pulses or a striking potential profile.

In some embodiments, the process is effected by subjecting the matrix to an acidic or basic aqueous electrodeposition of copper metal therein, wherein the electrodeposition is characterized by:

when using the acidic aqueous electrolyte, applying about $-0.2\ V_{SEC}$ to $-0.35\ V_{SEC}$ for a time period of 1 minute to 1 hour;

when using the basic aqueous electrolyte, applying about $-0.5\ V_{SEC}$ to $-1.3\ V_{SEC}$ for a time period of 1 minute to 1 hour; or when using the acidic or basic aqueous electrolyte, applying a constant current of about $-5$ to $-15$ mA/cm$^2$ for a time period of 1 minute to 1 hour.

In some embodiments, when using an acidic aqueous electrolyte, copper electrodeposition is effected by applying a constant potential at a level that causes hydrolysis and hydrogen evolution.

In some embodiments, when using a basic aqueous electrolyte, copper electrodeposition is effected by applying a pulse potential.

According to some embodiments, the type of copper ion source, namely the selection of the copper salt to be used in the electrodeposition of copper, has an effect on the desired final product—a network of metallic copper clusters deposited within the bulk of the matrix. Therefore, according to some embodiments of the present invention, the aqueous electrolyte comprises copper cyanide, copper pyrophosphate and copper fluoborate, which are copper ion sources conducive to forming the desired microstructure of copper deposition in the matrix. In some embodiments, the use of these salts render the use organic additives in the electrolyte unnecessary.

Practically, the process is effected in an aqueous copper electrodeposition bath. The matrix is weaved, shaped, cut and otherwise pre-shaped into a desirable form, and thereafter subjected to the electrodeposition of copper therein. Alternatively, structural elements are weaved, shaped, cut and otherwise pre-shaped into a desirable form from the composite conductor element, namely after the electrodeposition is effected. For example, composite conductor strips and/or fibers can be weaved into wires and cables that can be further breaded and assembled to form larger conductive structural elements.

FIG. 3 presents a schematic illustration of a composite conducting element fabrication process 10, wherein matrix strip 11 is spun to a thread that is submerged in copper electrodeposition bath 12, and thereafter weaved into sheet 13, and manufacturing device, according to some embodiments of the present invention.

Throwing Power Criterion:

Throwing power can be used as a guideline for selecting copper ion source and the electrolyte composition in general, which would be suitable for effecting the presently claimed method and the product thereof, as disclosed herein. A common way in which deposit uniformity is characterized is through its throwing power. Although this is defined differently depending on the object being plated, the throwing power measures the ability of a solution to plate into low current density areas with the same thickness as in the higher current density areas. In essence, this characterizes the ability of a plating bath to produce a uniform deposit on an irregularly shaped cathode (substrate). It is most commonly calculated as the ratio of the deviation between the thickness obtained in the portion of the surface deemed difficult to coat from the average plating thickness divided by the average thickness. Factors in DC plating related to the throwing power are combined together in a dimensionless Wagner number which gives a ratio of polarization resistance due to the electrode reactions to the electrolyte ohmic resistance. In this relation, the electrolyte conductivity, the characteristic dimension of the part to be plated, the slope of the polarization curve, the overpotential and the current density all play a role in determining the throwing power (TP) value of a given metal deposition setup. The larger the TP value, the more uniform is the current distribution and the better is the throwing power.

Thus, according to some embodiments of the present invention, the process of manufacturing the composite element according to some embodiment thereof, includes submerging the non-metallic conductive porous matrix in an aqueous electrolyte containing copper ions, and applying a current/potential to effect copper deposition, wherein the electrolyte is characterized by a throwing power of at least 10, 15, 20, 25, 30, 35, 40, or at least 50%.

Beside or instead of being selected and concocted to exhibit a desired throwing power, the electrolyte, according to some embodiments, may further optionally contain an organic additive.

An Organic Additive:

According to some embodiments of the present invention, the process for manufacturing provided herein, calls for use of an organic additive in the electrolyte, as discussed and demonstrated in the Examples section that follows below.

According to some embodiments, the electrolyte may optionally contain a suppressing agent and/or leveling agent. In the context of embodiments of the present invention, a "suppressing agent" refers to an organic compound that decreases the plating rate of the electroplating bath on at least part of a substrate. The terms "suppressors" and "suppressing agents" are used interchangeably throughout this specification. The term "leveling agent", as used herein, refers to an organic compound that is capable of providing a substantially planar metal layer during electrodeposition. The terms "levelers", "leveling agents" and "leveling additive" are used interchangeably throughout this specification.

In most cases, leveling agents are N-containing compounds and optionally substituted and/or quaternized polymers, such as polyethylene imine and its derivatives, polyglycine, poly(allylamine), polyaniline (sulfonated), polyvinylpyrrolidone, polyvinylpyridine, polyvinylimidazole, polyurea, polyacrylamide, poly(melamine-co-formaldehyde), polyalkanolamines, etc., which are given here without the intention to limit the invention too these exemplary additives.

According to some embodiments, the organic additive may be, without limitation, one or more of polyethylene glycol (PEG; Mw=500-8000 gr/mol), nitrogen-containing molecules, benzotriazole, thiourea, acetonitrile, polyethers, polyoxyethers, thiols, azoles, and imidazoles.

Additional information pertaining to electrolyte additives which effect copper electroplating, is available to the skilled artisan in, for example, "Modern Electroplating" by Dini and Snyder, [Fifth Edition Edited by Mordechay Schlesinger and Milan Paunovic, 2010, John Wiley & Sons, Inc], and in "Review—Management of Copper Damascene Plating" by Carpio and Jaworski [Journal of The Electrochemical Society, 166 (1) D3072-D3096 (2019)], all of which are incorporated herein by reference in their entirety.

Electronic Circuits and Devices:

The present invention is also drawn to an electrical circuit or device that includes the composite conductor element, as provided herein. Exemplary devices include, without limitation, connectors in micro-electronics circuit boards, cables for ultra-fast charging in electric vehicles (EV) charging stations, air/space-craft devices and utility companies. Sectors being targeted and utilized high power cables area: Renewable energy, hydropower, wind, other energy, infrastructure, residential sector, commercial sector, industrial, chemical & petrochemical, mining, power utilities, oil & gas, and other Industrial users.

It is expected that during the life of a patent maturing from this application many relevant composite conductor elements comprising copper and a non-metallic matrix will be developed and the scope of the term composite conductor element is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is totally devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or characteristic, compared to a given standard.

The term "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the terms "process" and "method" refer to manners, means, techniques and procedures for accomplishing a given task including, but not limited to, those manners, means, techniques and procedures either known to, or readily developed from known manners, means, techniques and procedures by practitioners of the chemical, material, mechanical, computational and digital arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments of the invention in a non-limiting fashion.

Example 1

Electrodeposition of Copper Inside CNT Fabrics

A proof of concept of some embodiments of the present invention was carried out by subjecting CNT strips to copper electrodeposition in a single step copper electroplating in an aqueous electrolyte. These preliminary experiments for estimation opportunity to fill the internal surface of the CNT fabric by copper without, or with reduced copper deposition on the external surface, were conducted in regular electrochemical cell and in special cell with glass shields isolated CNT fabric electrode.

In this exemplary embodiment, in order to provide a copper filling in the CNT mesoporous, low potential was applied with a follow-up weaving of the copper filled CNT strips into stretchable cables. Cost-effective automated process makes the ability to fabricate conductors with adjusted conductivity, different current carrying capacity and mass by alteration of the volume fraction ratio CNT and Cu in composite material.

Table 1 presents variation in the weight density and specific surface area of a batch of CNT fabric samples, before subjecting the fabrics to low current electrodeposition of copper therein.

TABLE 1

| CNT fabric sample | thickness μm | W g | S cm$^2$ | V cm$^3$ | D g/cm$^3$ | Specific surface area (m2/g) |
|---|---|---|---|---|---|---|
| 1 | 30 | 1.3800 | 643.2 | 2.2500 | 0.613 | 172.3 |
| 2 | 90 | 1.7951 | 950.2 | 8.5514 | 0.2104 | 156.0 |

In a control experiment, a pretreated CNT fabric strip with improved wettability was placed as a working electrode between copper counter electrodes. In the experiment for forming an exemplary CNT-Cu composite strip, according to embodiments of the present invention, the external surface of the CNT fabric strip was isolated by glass shields and immersed in electrochemical cell equipped by a vacuum pump. After pumping the plating cell the copper electrolyte for 10-15 minutes, the electrode was placed between the glass screens. Copper wire, as counter electrode isolated by glass tube with open end near the cell bottom was put in the cell. In both experiments copper electroplating was conducted at potentiostatic mode at applied low cathodic potential (−30 mV). Copper deposits formed in acid copper electrolyte on the CNT fabric strip (control and exemplary embodiment) at selected conditions in regular cell are shown in FIGS. 4A-B.

Figure 4A:
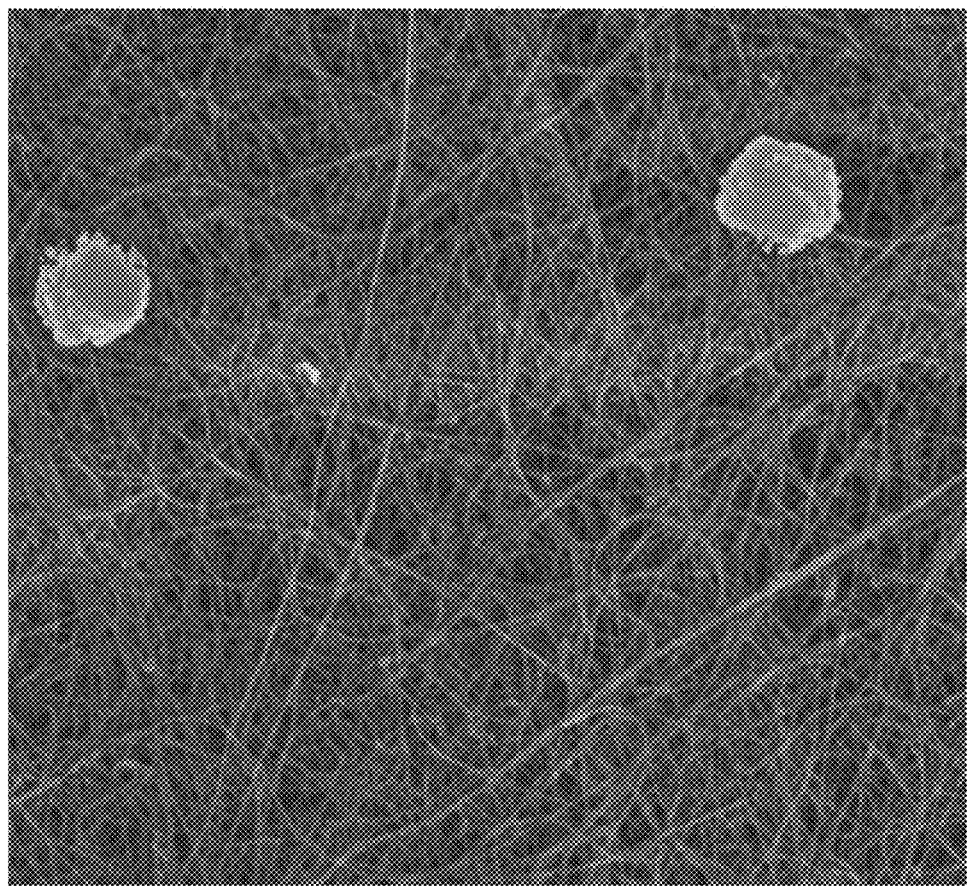
FIGS. 4A-B presents HRSEM images obtained from the surface of the CNT fabric after copper electroplating at potential.
Figure 4B:
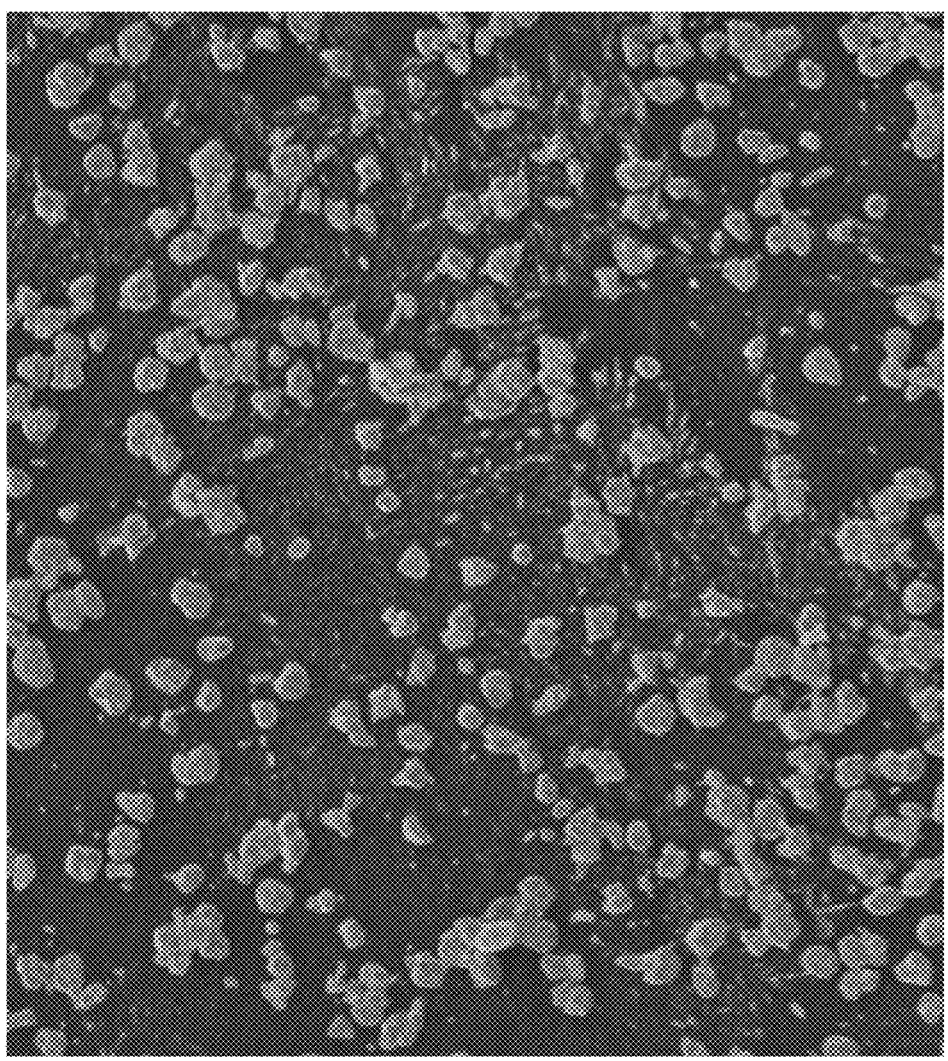

FIGS. 4A-B presents HRSEM images obtained from the surface of the CNT fabric after copper electroplating at potential: (FIG. 4A) −30 mV, 60 s; (FIG. 4B) −30 mV, 600 s in acid copper sulfate electrolyte.

As can be seen in FIGS. 4A-B, single irregular copper crystallites were formed on the surface of the CNT fabric at a potential of −30 mV during 60 seconds. Prolonged exposure of the CNT fabric for 600 seconds at this conditions leads to growth the coarse agglomerated copper deposit on the external surface of the CNT fabric strip.

FIGS. 5A-B presents HRSEM images (FIG. 5A) secondary electron (SE) and (FIG. 5B) back scattered electron (BSE), obtained from the surface CNT fabric at copper deposition between two glass shields on CNT fabric strip at cathodic potential −30 mV, 600 seconds in acid copper sulfate electrolyte.

As can be seen in FIGS. 5A-B, fine copper crystals were formed inside fabric's layers when copper was deposited on a CNT strip having its surface obscured by a glass shield.

Comparing the composite conductors presented herein with metal conductors, it is demonstrated that the mass of the composite conductors decreased by 3-5 times, while conductivity is maintained comparable. The current carrying capacity of the composite conductors has increased while withstanding stability at large changes in temperature without substantial variation in resistivity.

Example 2

Electrolyte Effect

The method for the electrodeposition of Cu network embedded inside CNT tissue, according to some embodiments of the present invention, is demonstrated below. The novelty of this method is three-fold:
1. It utilizes only aqueous electrolytes, which are usually simpler to handle, and provide pure Cu deposits, free of oxides;
2. It consists of a single deposition step, decreasing the process complexity; and 3. It utilizes commercial randomly oriented CNT tissue as a substrate, therefore can be adapted to other carbon wires.

The method affords a new composite material for lightweight electrical power conductors with higher current carrying capacity (ampacity), substantially higher than current materials being used in the industry, such as copper and aluminum. This will allow a major reduction in the cables weight as well as an increased ability to carry currents (ampacity), allowing high energy in battery packs (reduced weight) and allow ultra-fast charging (increased ampacity).

Copper pyrophosphate electrolyte was prepared from 34 gr/L copper pyrophosphate ($Cu_2P_2O_7$), with mixed with 175 gr/L potassium pyrophosphate ($K_4P_2O_7$) and 10 gr/L potassium nitrate ($KNO_3$) dissolved in double-deionized water. The electrochemical experiments were carried out at 40° C. and pH=8.5 (adjusted with pyrophosphoric acid, $HiP_2O_7$).

Copper sulphate electrolytes—two electrolytes were prepared with different concentrations of copper sulphate ($CuSO_4$), and sulfuric acid ($H_2SO_4$), one with the standard composition of conventional acidic $CuSO_4$ baths (denoted "1" in Table 2 below) and another with the composition of conventional acidic $CuSO_4$ baths with higher pH and lower Cu concentration (denoted "II" in Table 2 below). Polyethylene glycol (PEG, Mw=2000 gr/mol), benzotriazole (BTAH), thiourea (TU) and acetonitrile (MeCN) have been added as well. Table 2 below lists the exact compositions of some of the $CuSO_4$ electrolytes.

TABLE 2

|  | I | II | I + PEG | II + PEG | II + BTAH | II + TU | II + MeCN |
|---|---|---|---|---|---|---|---|
| $CuSO_4 \cdot 5H_2O$ [gr/L] | 200 | 59 | 200 | 59 | 59 | 59 | 59 |
| $H_2SO_4$ [gr/L] | 45 | 210 | 45 | 210 | 210 | 210 | 210 |
| $Cl^-$ [ppm] | — | 30 | — | 30 | 30 | 30 | 30 |
| PEG [ppm] | — | — | 500 | 500 | — | — | — |
| BTAH [ppm] | — | — | — | — | 12 | — | — |
| TU [ppm] | — | — | — | — | — | 1000 | — |
| MeCN [ppm] | — | — | — | — | — | — | 1000 |

Electrochemical cell: the electrochemical measurements were performed in a three-electrode cell, employing a standard calomel electrode (SCE) as a reference electrode; Cu foil (99.99%) as a counter electrode; and CNT tissue (Tortech nanofibers, 0.75 mg/cm²) as a working electrode.

Electrochemical measurements: potentiodynamic polarization curves were obtained at a sweep rate of 20 mV/sec, starting from open circuit potential (OCP), scanning toward cathodic potentials until the first vertex potential, then shifting the direction of the scan until the second vertex potential, and back to OCP.

Deposits characterization: surface morphology was imaged with a high-resolution scanning electron microscope (HR-SEM, Zeiss, Ultra-Plus). Images were obtained from the upper coating layer, as well as from the inside of tissue. CNT samples for imaging the inside layers were prepared by gluing the samples from one side, and peeling off the upper Cu coating, so that an inner CNT layer is exposed. Cross section samples of the composite material were prepared as well. The chemical composition was confirmed by energy dispersive x-ray spectroscopy (EDS).

Electrical measurements: Cu-CNT composite was prepared by electrodeposition from a $Cu_2P_2O_7$ electrolyte at pH=8.5 and 40 40° C., by consumption of up to 8 C/cm². Samples with typical size of 1×0.5 cm² and 10 μm thick were cut and used for the measurements. The samples were connected from both ends to a power supply (plating electronic, pe 4383), and various constant voltages was transmitted through them at room temperature, while the current was monitored. The resistivity at each point was calculated using Ohm's law.

Using copper pyrophosphate electrolyte, bright Cu coatings were observed on the outer surface of the tissue. SEM images acquired therefrom show a very smooth and fine morphology of the Cu coating. Images obtained from the inner surface of the tissue confirm the presence of submicronic (about $10^1$-$10^2$ nm) Cu particles there. The distribution of the Cu particles inside the tissue is uniform, and their size and density depend on the experimental parameters.

Further potentiostatic experiments were carried out for investigating Cu electrodeposition on CNT from copper pyrophosphate electrolyte. The Current-time transient obtained at $-1.2$ $V_{SCE}$ (versus a saturated calomel electrode) in $Cu_2P_2O_7$ electrolyte at pH=8.5 and 40° q exhibited a sharp increase in cathodic currents and a consecutive drop, constituting a peak, associated with Cu nucleation. This peak was followed by a steady current, attributed to growth of the Cu film. However, after deposition of ca. 4 C/cm², additional decrease in the cathodic currents was observed.

SEM images obtained at distinct stages of Cu deposition showed that a continuous Cu coating on the external electrode surface can be obtained after only 1 C/cm². Yet, the coating obtains the color and brightness characteristic to metallic Cu only after the consumption of 4 C/cm², when it is thick enough. SEM images obtained from the inner surface of CNT electrodes reveal that barely any Cu deposits are present within the tissue at deposition of 1 C/cm² or less, and only after prolongation of the process to 4 C/cm² or more, is Cu deposited inside the tissue in a significant amount. Therefore, the continuous decrease in the cathodic currents observed during deposition for more than 3 min. under $-1.2$ $V_{SCE}$ might be attributed to an increase in the concentration polarization inside the CNT. Nevertheless, it should be emphasized that the applied potential dictates this behavior and different trends could be observed if the deposition is carried out under lower cathodic potentials.

HR-SEM images obtained from inside the CNT after deposition from $Cu_2P_2O_7$ at $-1.2$ $V_{SCE}$ for 10 C/cm², indicated that better interconnection among Cu deposits was accomplished by using this electrolyte. A uniform distribution of Cu deposits was demonstrated inside the CNT matrix. Meanwhile, finer microstructure and smaller (about 10 nm) interconnected Cu crystals deposited inside the CNT. These finding substantiate the claim that the electrodeposition of interconnected Cu deposits inside CNT tissue is feasible.

The electrodeposition of Cu from the electrolytes provided herein, under diverse electrical potentials, has been studied as well. HR-SEM analysis of images obtained from within the CNT tissue, indicates that an increased amount of smaller and denser Cu particles is deposited inside the CNT when the cathodic potential is higher. This tendency could be attributed to the favorable nucleation under higher cathodic potentials. Nevertheless, such an effect on the morphology of the external Cu coating is not as evident, and the alternative explanation is proposed as follows.

Without being bound by any particular theory, it is assumed that during the deposition, there is evolution of hydrogen gas due to a simultaneous reduction of the electrolyte. As the potential is more cathodic, the currents invested in this reaction also increases, leading to increased amounts of hydrogen evolved during the deposition. Under the potentials applied here, this reaction is minor, the current efficiency of Cu deposition is high, and there is not an evident damage to the coating caused by the eruption of hydrogen bubbles. However, while hydrogen bubbles formed on the external surface of the tissue are detached and released, the release of bubbles formed inside the tissue is less likely. Hence, some of the bubbles formed inside the tissue are entrapped, leading to expansion of the tissue, increasing the number of available nucleation sites and facilitating the deposition inside it.

To test this hypothesis, hydrogen evolution reaction (HER) was carried out on a CNT substrate under $-1.3\ V_{SCE}$, from a similar electrolyte, containing no Cu, so that there are no other simultaneous reduction reactions apart from the HER. Later, the expanded CNT tissue was moved to the Cu electroplating bath, and Cu was deposited under $-0.8\ V_{SCE}$ and 8 C/cm$^2$. As exhibited in HR-SEM images obtained from the inner surface of the CNT, the presence of hydrogen inside the CNT tissue indeed prompts the deposition of Cu there. A similar experiment was performed, only instead of HER, oxygen evolution reaction (OER) was carried out in the same Cu-free electrolyte, under $1\ V_{SCE}$, and Cu was deposited on the expanded CNT tissue under the conditions stated previously. The results were like those observed in the presence of hydrogen. Thus, it can be concluded that the favored Cu deposition inside the CNT tissue is owed to its expansion, and is not the results of any chemical surface modification of the CNT itself (due to its reduction) or to another chemical reaction with hydrogen specifically. Based on these findings, it can be determined that the electrodeposition of Cu inside the CNT is promoted under higher cathodic potentials and is assisted by gas evolution.

The electrodeposition of Cu inside CNT becomes more difficult as the tissue is thicker, and the tendency for deposition inside it decreases. Gas-assisted deposition is one approach to deal with this problem. Pre-bubbling of either hydrogen or oxygen gas inside the CNT can be done by electrochemical reduction/oxidation of water with volume expansion of even 1000%. Later-on Cu can be electrodeposited as described previously on the expanded tissue, increasing the content of Cu inside the tissue. On that matter, other inert gases (such as nitrogen) might be more appropriate since they are not expected to react chemically with the Cu deposits. However, this method is somewhat inconvenient for synthesis of the composite material, since the expanded tissue is very delicate and can shrink back with every minor mechanical tension applied on it. Hence, an alternative method is offered; Cu electrodeposition can be performed by only one reduction step, using the Cu electroplating bath formerly discussed, yet, applying higher cathodic potentials.

Additive free electrolytes were studies as an optional simple embodiment of the present invention. Two compositions of additive-free electrolytes were prepared as detailed in Table 2. The standard electrolyte (composition I) contains high concentration of Cu and it is the conventional composition used for industrial Cu electroplating. The low-Cu electrolyte (composition II) contains low Cu concentration, is more acidic, and has higher throwing power.

Cu was deposited on CNT electrodes from both electrolytes. In both cases only a negligible amount of it was deposited inside the CNT fabric, as was corroborated by HR-SEM image analysis. HR-SEM images obtained from the external Cu coating also revealed smoother surface in the low-Cu electrolyte, validating its higher throwing power in this system as well.

Oxygen evolution reaction (OER) was carried out on a CNT tissue, from a Cu-free electrolyte followed by Cu deposition from an additive-free electrolyte with a standard composition. HR-SEM images image analysis confirmed that indeed the deposition of Cu inside the tissue is enabled by this procedure.

The electrodeposition of Cu inside CNT tissue from CuSO$_4$ electrolytes was investigated in the presence of several organic additives. It was found that the addition of suppressing and leveling agents to the electrolyte inhibits the deposition on the external tissue surface, thus promoting the deposition inside it. Among these additives, are MeCN, BTAH, TU, and PEG (see Table 2).

Analysis of the HR-SEM images, obtained from the external Cu coating, confirmed that in the presence MeCN the deposition on the external CNT surface is suppressed; surface coverage is lower in comparison to the additive-free electrolyte, and the Cu crystals are larger. This suggests MCCN may block some of the nucleation sites on the CNT surface. Cu deposition inside the CNT is enabled using this electrolyte, perhaps owed to the hindered surface deposition. This effect was also observed when Cu is deposited from the additive-free electrolyte (both compositions) after the CNT tissue had been impregnated in pure MeCN for 24 hours, however, in this case the efficiency was lower.

Cu was also deposited on CNT from a low-Cu electrolyte containing BTAH, and visual inspections indicate slower corrosion rate of Cu deposited from it, in comparison to all other electrolytes. BTAH is an inhibitor for Cu corrosion, and these findings indicate it might also be efficient if added directly to the electrolyte. This will be significant later-on for mitigating the corrosion rate of the composite wire. Analysis of HR-SEM images obtained from CNT electrodes after galvanostatic deposition, indicated that the deposition on the external surface is suppressed, and confirmed the presence of Cu deposits inside the CNT.

PEG appears to be more efficient is assisting Cu electrodeposition inside CNT tissue. The relatively large PEG molecules adsorb to the substrate surface, alter the polarization at those specific sites, thus inhibiting the deposition on the surface. Meanwhile, due to their relatively large size, PEG molecules cannot protrude pores that are not large enough, thus deposition inside concavities, through-holes and such, is prompted. HR-SEM images obtained from the outer surface of the CNT tissues after deposition from both electrolytes (high and low concentration of Cu) confirmed that PEG has a suppressing effect on the surface deposition. This inhibition again enables homogeneous deposition of Cu inside the tissue, more so than observed in the presence of other additives. The addition of PEG to the low-Cu electrolyte was proven to be more efficient than its addition to the standard one, probably since the initial efficiency of this electrolyte is higher. Additionally, electrodeposition under higher cathodic currents produces higher content of Cu deposited inside the CNT.

The addition of thiourea (TU), a common leveling agent in CuSO$_4$ electrolytes, was studied by analysis of HR-SEM images obtained from the outer Cu coating, and showed a pronounced leveling effect of TU. TU adsorbs to flat sites on the substrate surface, thus hindering the deposition on them and promoting deposition inside pores and concavities, resulting in a leveling effect. It should be noted that two distinct Cu morphologies are observed on the external Cu coating of the same sample. The bottom Cu layer is characterized with finer structure and the leveling effect is most noticed there. However, additional Cu crystals deposited on it are considerably larger and coarser, significantly increasing the surface roughness. It is known that TU reacts with Cu$^{2+}$ ions in the electrolyte and form CuS which tend to adsorb to Cu substrates in particular. It is possible that owed to non-ideal deposition conditions, CuS was adsorbed on the first layer of deposited Cu, leading to an increased surface electrical resistance and coarser Cu deposits. Still, the presence of TU also evidently allows infiltration and subsequent deposition of Cu inside the tissue, and not only on the outer surface.

Further experiments indicated that interconnection among the copper particles deposited inside the CNT from $CuSO_4$ electrolytes is a realistic expectation, at least in some of the electrolytes studied so far. SEM images of copper deposits inside the CNT tissue, taken after deposition from the low-Cu electrolyte in the presence of PEG or BTAH, confirmed the deposition of interconnected Cu particles inside the CNT. However, since the density of the Cu particles deposited from those electrolytes is lower than what can be achieved using the $Cu_2P_2O_7$ electrolyte, extended growth period is required before this connection is reached, resulting in larger Cu particles.

Common ampacity values reported in the literature for copper concern the current density transmitted through copper and leading to electro-migration, the frequent failure mechanism in copper, which is particularly significant for microelectronics and interconnects. However, owed to heating of the cable during the transmission of current, its resistivity may also increase, further limiting the current allowed for transmission. Therefore, from the engineering point of view, the current density a typical copper cable can carry is restricted to only several hundreds of $A/cm^2$, depending on the temperature and insulation.

Different amounts of Cu were deposited on CNT tissues from an alkaline $Cu_2P_2O_7$ electrolyte, and 1 cm wide strands were prepared. A constant voltage was transmitted through them and the current was measured simultaneously. The resistivity of the wires was than calculated according to Ohm's law. It was seen that with the increase in content of Cu (higher charge consumed during the deposition), the resistivity of the composite decreases. The relatively high resistivity measured in this method is associated with imperfections in the electric contacts in the measurement device which become more significant at higher current. Meanwhile, two-point probe measurements indicated that the conductivity of the composite is comparable to that of Cu.

It was seen that the resistivity of the composite remains constant even at currents as high as 1800 $A/cm^2$, which are at least three-times higher than the standard for Cu cables. This can be explained by an improved heat dissipation provided by the CNT tissue, and by the design of the composite material, where a failure of a single micro-wire does not lead to failure of the entire cable.

According to some embodiments of the present invention, a composite material composed of Cu network embedded in a CNT tissue has been demonstrated as an alternative material for electrical conductors. Cu Electrodeposition was employed as a simple, cost-efficient preparation method, providing high-purity deposits. Electrodeposition methods enabled the deposition of Cu inside the 3D CNT tissue; though, only under specific conditions.

Cu was successfully electrodeposited inside CNT tissue from an aqueous $Cu_2P_2O_7$ electrolyte. SEM images verify that smooth and fine Cu coatings were obtained on the external CNT surface, attributed to the high throwing-power of this electrolyte, and nanometric interconnected Cu particles were deposited inside the tissue.

Various aqueous electrolytes containing $CuSO_4$ were used after an additive-free electrolytes showed poor ability to deposit copper inside the tissue, and only random and occasional Cu crystals were observed, while the addition of suppressing or leveling agents to the electrolyte, prompted Cu deposition inside the tissue. The interconnected Cu particles deposited in the CNT tissue using $CuSO_4$ electrolytes are larger than those deposited from the $Cu_2P_2O_7$ electrolyte (about 10 vs about 100 nm, respectively). Therefore, $Cu_2P_2O_7$ electrolyte has shown to be a preferred embodiment for some applications of the present invention.

Gas-assisted deposition, and particularly deposition under high cathodic potentials, are methods to further enhance and increase the content of Cu deposited inside the CNT and were successfully employed to fabricate composite Cu-CNT wires using thicker CNT substrates. The composite wires show the potential to carry higher currents that can be provided by pure Cu cables, owed to their unique material-combination and design.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A composite conductor element, comprising a non-metallic conductive porous matrix and a plurality of metallic copper particles incorporated therein, wherein:
    said non-metallic conductive porous matrix is a randomly oriented matrix;
    said copper particles are incorporated within a bulk of said non-metallic conductive porous matrix, and
    said copper particles are arranged in clusters of metallic copper crystals having a size that ranges from 1 nm to 150 µm, and being connected to each other by metallic copper threads forming a metallic copper network on and within said bulk of said non-metallic conductive porous matrix;
    the composite conductor element is characterized by an ampacity of at least 100 $A/cm^2$ over at least 100 µm of the element, and is scalable and capable of forming macroscopic conductive elements.

2. The composite element of claim 1, characterized by a specific gravity that ranges from 1.5 $g/cm^3$ to 8.5 $g/cm^3$.

3. The element of claim 1, wherein said non-metallic conductive porous matrix is formable, ductile and scalable.

4. The element of claim 1, wherein said non-metallic conductive porous matrix is a non-oriented matrix.

5. The element of claim 1, wherein said non-metallic conductive porous matrix is selected form the group consisting of a carbon nanotube fabric, a carbon microfiber matrix, a graphene fiber fabric, a Buckminsterfullerene matrix, a carbon nanofoam matrix, and carbon nanobuds matrix.

6. A process of manufacturing the element of claim 1, comprising submerging a non-metallic conductive porous matrix in an aqueous electrolyte that comprises copper ions, and applying a current/potential to effect copper deposition, wherein said electrolyte characterized by a throwing power of at least 15%, and/or comprises an organic additive.

7. The process of claim 6, wherein said organic additive is a suppressing agent and/or a leveling agent.

8. The process of claim 6, wherein said organic additive is selected from the group consisting of polyethylene glycol, benzotriazole, thiourea, acetonitrile, a polyether, a polyoxyether, a thiol, an azole, an imidazole, and any combination thereof.

9. The process of claim 6, wherein said aqueous electrolyte comprises copper cyanide, copper pyrophosphate and copper fluoborate.

10. The process of claim 9, wherein said aqueous electrolyte is essentially devoid of said organic additive.

11. The process of claim 6, wherein said copper deposition comprises:
when using said acidic aqueous electrolyte, applying about −0.2 VSEC to −0.35 VSEC for a time period of 1 minute to 1 hour;
when using said basic aqueous electrolyte, applying about −0.5 VSEC to −1.3 VSEC for a time period of 1 minute to 1 hour; or
when using said acidic or basic aqueous electrolyte, applying a constant current of about −5 to −15 mA/cm$^2$ for a time period of 1 minute to 1 hour.

12. The process of claim 11, wherein when using said acidic aqueous electrolyte, applying a constant potential at a level that causes hydrolysis and hydrogen evolution.

13. The process of claim 11, wherein when using said basic aqueous electrolyte, applying a pulse potential.

14. An electric device, comprising the composite conductor element of claim 1.

15. The device of claim 14, selected from the group consisting of a micro-electronic circuit board, and an ultra-fast charging cable.

16. The element of claim 1, wherein said macroscopic conductive elements are selected from the group consisting of sheets, cables, yarns, fibers, and strips.

* * * * *